US005269983A

United States Patent [19]

Schulz

[11] Patent Number: 5,269,983

[45] Date of Patent: Dec. 14, 1993

[54] RUBBER-TO-STEEL MATED EMBOSSING

[75] Inventor: Galyn A. Schulz, Appleton, Wis.

[73] Assignee: James River Corporation of Virginia, Richmond, Va.

[21] Appl. No.: 817,993

[22] Filed: Jan. 9, 1992

Related U.S. Application Data

[63] Continuation of Ser. No. 650,211, Feb. 4, 1991, abandoned.

[51] Int. Cl.[5] .......... B29C 59/04

[52] U.S. Cl. .......... 364/25; 162/109; 162/117; 264/154; 264/219; 264/284

[58] Field of Search .......... 264/156, 284, 25, 219, 264/154; 425/363, 385; 162/109, 117, 205, 206, 362

[56] References Cited

U.S. PATENT DOCUMENTS

| | | | |
|---|---|---|---|
| 2,209,311 | 7/1940 | Karcher | 154/28 |
| 2,856,323 | 10/1958 | Gordon | 264/284 |
| 2,890,540 | 6/1959 | Britt | 264/284 |
| 3,047,454 | 7/1962 | Marcalus | 162/117 |
| 3,208,898 | 9/1965 | Chavannes et al. | 156/498 |
| 3,556,907 | 1/1971 | Nystrand | 156/470 |
| 3,868,205 | 2/1975 | Thomas | 425/500 |
| 3,911,187 | 10/1975 | Raley | 264/284 |
| 3,940,529 | 2/1976 | Hepford et al. | 156/210 |
| 4,105,491 | 8/1978 | Haase et al. | 156/553 |
| 4,280,978 | 7/1981 | Dannheim et al. | 264/156 |
| 4,284,465 | 8/1981 | Walbrun | 156/513 |
| 4,376,671 | 3/1983 | Schulz | 156/549 |
| 4,913,911 | 4/1990 | Wildt | 264/284 |
| 4,927,588 | 5/1990 | Schulz | 264/284 |

*Primary Examiner*—James Lowe

*Attorney, Agent, or Firm*—Sixbey, Friedman, Leedom & Ferguson

[57] ABSTRACT

A mated pair resilient and rigid embossing rolls are disclosed for achieving the advantages of conventional rubber to steel embossing, while avoiding the problems of conventional embossing approaches. In particular, a laser can be utilized to form recesses in a resilient roll such that the resilient roll receives protuberances of a rigid male embossing roll when the rolls are placed in contact. By providing recesses on the resilient roll, the pressure or force required for causing the rubber to flow around the protuberances can be significantly decreased as compared to conventional rubber to steel embossing. As a result, wear on the rolls is reduced, and smaller diameter rolls may be utilized, thereby reducing the cost of the embossing equipment. In addition, since less pressure is required to cause the rubber to flow about the protuberances, roll deflection is not a problem, and an embossed pattern can be imparted having a consistent, high degree of definition across the width of a web.

7 Claims, 3 Drawing Sheets

RUBBER-TO-STEEL MATED EMBOSSING

This application is a continuation of Ser. No. 07/650,211, filed Feb. 4, 1991, now abandoned.

TECHNICAL FIELD

The invention relates to embossing of paper products, for example, paper towels, toilet tissue and napkins, in which an improved embossing combination provides for more efficient manufacture and a more consistent and desirable embossed product.

BACKGROUND OF THE INVENTION

Paper products, such as paper towels, napkins and toilet tissue are widely used on a daily basis for a variety of household needs. Typically, such products are formed of a fibrous elongated web which is either packaged in rolls or in a folded stack. The fibrous webs are usually embossed to increase the bulk of the tissue and to improve the absorbency, softness and appearance of the product both as individual sheets, and in providing a uniform stack or roll package. Embossing can also aid in holding superposed plies of a web together. Generally, the embossing apparatus will include one or more rolls having male protuberances thereon for forming the embossed pattern, and a corresponding back-up roll which holds the web against the male embossing roll such that the embossed pattern is imparted to the web as it passes between the nip of the male roll and the backup roll.

In early embossing operations, a fiber roll was utilized as the backup roll, with the fiber roll formed of a hard cloth material. The male roll was formed of metal and included the protuberances engraved thereon. Prior to use of the rolls for embossing, the male roll and backup roll were run together (without a web passing therebetween), with soap and water utilized for lubricating and softening purposes. The male roll and backup roll would be run together until the fiber backup roll took on the female pattern corresponding to the protuberances of the male roll. The use of the rolls in embossing of paper products did not begin until after the female pattern or indentations corresponding to the male roll were achieved. Generally, this would require 24–36 hours of operation. Thus, the fiber roll approach required a great deal of initial start-up time and cost associated with operating the rolls without embossing web products.

In a steel to steel mated embossing approach, male protuberances are provided on a steel male roll, and corresponding female indentations are engraved in a female backup roll. As the web is passed through the nip formed between the two rolls, the male protuberances emboss the web, and are accommodated by the grooves or indentations in the female backup roll. To prevent damage as a result of interference between the protuberances and indentations, a clearance of 0.003–0.007 inches must be provided. Due to the required clearance, the steel to steel approach is not as successful (as other approaches, e.g. rubber to steel as discussed hereinafter) in softening the fibrous product, since the clearance reduces the breaking of fibers or fiber bonds as compared to other approaches in which the web is softened by "working" the web, i.e. by fracturing fibers or fiber bonds in the web.

In rubber to steel embossing, the steel roll is provided with the male protuberances and the web is squeezed against the male roll by a rubber backup roll, as the web passes through the nip. The rubber accommodates the protuberances by virtue of its resilience, and the rubber flows about the protuberances as force is applied to urge the rolls together. However, to ensure that the rubber flows about the protuberances to achieve an acceptable embossed pattern, an extremely large amount of force is required. As production demands have increased, the desirable lengths of such rolls has increased to 80–130 inches in length and sometimes even higher. An extremely large amount of force is required to urge such lengthy rolls together, while ensuring the rubber flows about the protuberances. However, where large amounts of force are applied, the roll may deflect or bend, such that acceptable rubber flow is achieved at the ends, but not in the center portions of the roll.

To prevent or reduce the deflection, very large diameter rolls, for example on the order of 20 inches, are necessary. This can make the rolls extremely costly. In addition, the large amount of force or pressure between the rolls develops a great deal of heat on the rolling contact surfaces. As a result of the heat, the rubber can actually burn off, and over an extended period of time, hardening, cracking and other heat associated wear will occur. As the rubber roll wears, pieces of rubber can actually become dislodged and thrown from the roll, exposing employees to a quite dangerous condition.

Thus, utilizing the conventional rubber to steel arrangement, it is extremely difficult to achieve a uniform embossed pattern along the length of the roll (or across the width of the web) as a result of difficulties in applying sufficient force to cause the rubber to deform about the protuberances along the entire length of the roll, and also as a result of the associated wear on the rubber roll. In addition, the rubber roll can become unsafe and require replacement or maintenance, making the process expensive, particularly since large diameter rubber rolls are required. However, the use of rubber rolls can be desirable in that as the web passes through the rubber to steel nip, the web is enhanced and softened as the sheet is worked, by virtue of the rubber flowing about the male protuberances resulting in breaking of the fibers (or bonds among fibers) extending through the web. Thus, a softer product is produced, as compared to a web which is run through the mated steel to steel arrangement.

In accordance with the present invention, it is desired to provide an embossing method and apparatus which reaps the advantages of rubber to steel embossing, while overcoming the disadvantages of conventional rubber to steel embossing approaches.

SUMMARY AND OBJECTS OF THE INVENTION

It is therefore an object of the present invention to provide an embossing method and apparatus which can provide a high degree of pattern definition, with substantially less pressure required between the embossing rollers, as compared to conventional rubber to steel embossing.

It is another object of the invention to provide an embossing method and apparatus which allows for significantly smaller roll sizes, thereby greatly reducing the capital costs associated with embossing equipment.

It is another object of the invention to provide a rubber to steel embossing method and apparatus in which the life of the embossing rolls is superior to that of conventional rubber to steel embossing.

It is a further object of the invention to provide an embossing method and apparatus in which a consistent, high degree of definition is provided along the length of the embossing rollers.

It is a further object of the invention to provide an embossing method and apparatus in which the embossing process provides a highly defined embossed pattern on the paper product, with the softness of the paper product enhanced.

These and other objects and advantages are achieved in accordance with the present invention, in which a steel embossing roll is provided having a plurality of male protuberances extending therefrom, with a mated rubber backup roll urging the fibrous web substrate against the male embossing roll, thereby imparting a highly defined embossed pattern to the paper substrate, for forming paper towels, napkins, or tissues. As the paper substrate is passed through the nip between the rolls, the web is forced about the male protuberances, and against the land areas of the steel roll, as well as into the indentations and outer peripheral surfaces of the rubber roll. As a result, a highly defined embossed pattern is provided, and the sheet is softened due to the fracturing of the fibers as the web is pinched between the rolls.

In accordance with one aspect of the present invention, the inventor has recognized that a laser may be utilized for burning away selected portions of a rubber roll, thereby providing a mated rubber roll having indentations corresponding to the protuberances of the male embossing roll. Due to the female indentations in the rubber roll, significantly less pressure is required (between the male and female rolls) for causing the rubber to press the web about the protuberance and against the land areas of the male roll. Thus, the problems associated with wear, particularly heat related wear, of the prior art rubber to steel embossing devices are avoided. In addition, since a large amount of force or pressure is not required for forcing the rubber to flow about the male protuberances, problems associated with non-uniform or insufficient force along the length of the roll are avoided, such that a more consistent pattern is imparted to the web along the length of the roll (or in other words, across the width of the web being passed through the rolls).

Perhaps even more significantly, since consistency of the pressure or definition across the length of the web is not a problem, the rolls need not be as large in diameter to prevent deflection at central portions of the roll, and the capital costs associated with the embossing equipment may be greatly reduced. In fact, it may be possible to even eliminate the embossing station and to utilize embossing rolls as feed rolls, thereby accomplishing the feeding and embossing functions with a much less expensive apparatus. Since the rolls may be formed of a much smaller diameter, it also may be possible to provide additional embossing rolls, at a total cost of less than the cost of a single conventional embossing station. Utilizing additional sets of embossing rolls, higher definition and enhanced softening is provided by repeated rubber to steel embossing operations.

These and other objects and advantages of the present invention will be apparent from the following detailed description read in conjunction with the drawings.

DETAILED DESCRIPTION OF THE PREFERRED EMBODIMENTS

Figure 1:
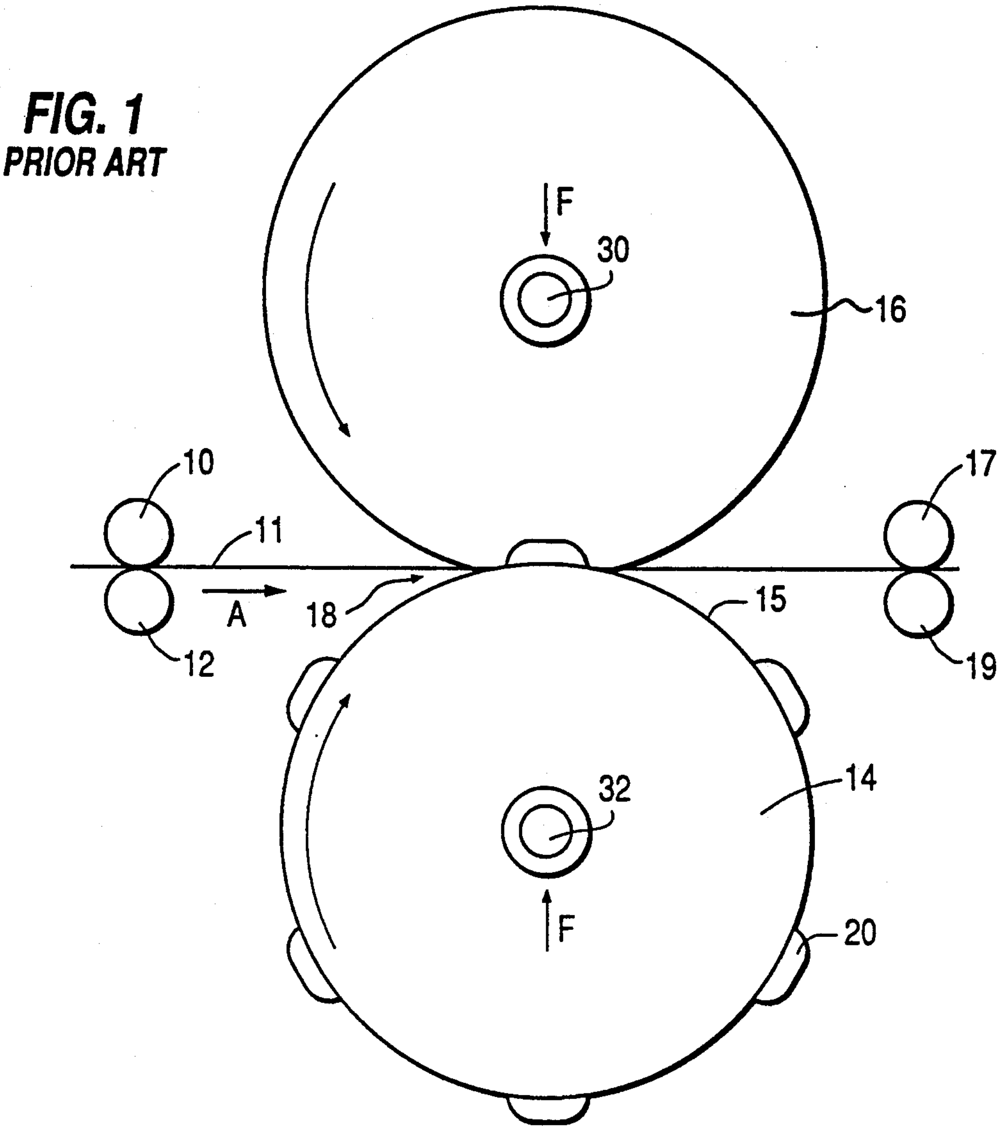
FIG. 1 PRIOR ART
FIG. 1 is a side view of a conventional rubber to steel embossing arrangement.

As shown in FIG. 1, in a conventional rubber to steel embossing operation, a pair of feeder or drawing rolls 10,12 are provided to draw the web from a supply, typically a large stock roll often referred to as an unwind roll (not shown). The rolls 10,12 are typically on the order of six inches in diameter, and have a knurled surface to aid in grasping the web, to draw it from the stock roll and pass it to the embossing rolls in the direction shown by arrow A. Alternatively, a belt arrangement is also conventionally utilized for feeding the web from supply rolls (or parent rolls) with the belt engaging the outer periphery of the supply to assist in paying out the web from the supply.

The embossing station includes a pair of rolls 14,16, which are urged together to form a nip 18 through which the web 11 passes to emboss the web. The conventional rubber to steel embossing arrangement, also includes a steel roll 14 having a plurality of protuberances shown representatively at 20. For illustrative purposes, the protuberances shown in FIG. 1 are exaggerated in comparison to the size of the rolls. Typically, the protuberances extend on the order of 0.004–0.080 inches from the surface of the roll. In addition, typically the roll will include many more protuberances than that shown in FIG. 1. The protuberances may be of any desired shape, such as a simple rectangular shape for providing numerous small rectangular embossments on a web, or somewhat intricate designs or patterns, to impart floral or other decorative designs embossed into the web. The roll 16 includes a surface formed of a resilient material such as rubber, to accommodate the protrusions of the steel roll 14.

Force or pressure is applied to one or both of the rolls 14,16 as illustrated by arrow F, such that the rolls 14,16 are urged against one another. The pressure will cause the resilient roll 16 to deform about the protrusions, such that the web is pressed about the protrusion and onto the land areas (i.e. the outer surface areas of the roll 14 surrounding the protuberances) 15, thereby embossing the web. The cooperation of the rubber and the steel also performs an ironing or calendering operation by virtue of the pressing action of the rubber against the roll 14 and protuberances thereon, such that the web is "worked", by breaking of fibers or bonds between fibers in the web. The embossing and working of the web bulks up the web and provides a softer product.

To ensure that the rubber flows about the protuberances, a great deal of force is required, such that the pressure between the rolls is sufficient to cause deformation of the resilient rolls about the protuberances. The forces are generally provided by a hydraulic system incorporated into the frame of the embossing station. Due to the extremely high pressure between the rolls in rolling contact, and also due to the repeated flexing and expanding of the resilient surface of the roll 16, a tremendous amount of heat is created. The heat causes the rubber surface material to deteriorate rapidly, causing hardening and cracking of the rubber, and deteriorating the ability of the roll 16 to deform about the protuberances of the steel roll. The resulting wear diminishes the distinctness or definition of the embossed pattern and can impart unwanted patterns to the web. In addition, as the resilient surface degrades, portions of the rubber may be dislodged and thrown from the roll causing a dangerous work environment.

As production requirements have increased, the length of the rolls have increased to improve the output or production capacity. While older embossing stations have utilized rolls of 80 inches or less in length, the trend with newer embossing stations has been to utilize rolls in excess of 100 inches, and even 130 inches or greater. Particularly where longer rolls are utilized, the problem of roll deflection reduces the ability of the rolls to provide a consistent highly defined pattern across the width of the web (or along the length of the rolls).

Figure 2:
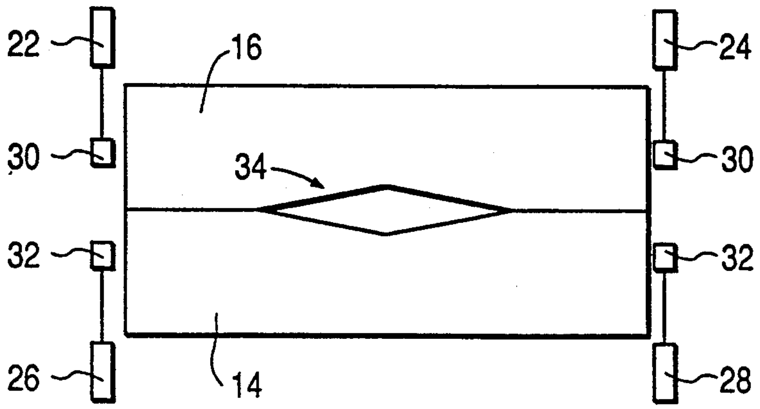
FIG. 2 PRIOR ART
FIG. 2 is a frontal view of a pair of embossing rolls, and illustrates the problem of deflection.

FIG. 2 shows a frontal view of the embossing rolls 15,16, with the protuberances of the steel roll omitted for clarity. An hydraulic system is provided in the form of hydraulic cylinders 22,24, 26,28 for urging the rolls toward one another, to allow the rubber to flow about the protuberances. The hydraulic cylinders apply force to the shafts 30,32 (through suitable bearings) at the outer portions or ends of the rolls to urge the rolls together. Since the forces are applied at the ends of the rolls, the rolls may tend to deflect at central portions of the roll as shown somewhat exaggerated at 34 in FIG. 2. The rolls will deflect more in the center, since the central portions are remote from the application of the forces by the hydraulic system, such that the pressure or force is insufficient to cause the rubber to flow about the protuberances of the steel roll 14. As would be understood by one skilled in the art, the deflection of the rubber will be much greater than that of the steel roll, and the deflection of the steel roll may be negligible. As a result of the deflection, it is difficult to provide a uniform highly defined embossed pattern to the web across the width of the web. In order to reduce the amount of deflection, extremely large rolls are required, typically on the order of 20 inches in diameter. Such large rolls can be extremely expensive, both in terms of initial cost and in terms of maintenance costs, particularly since the tremendous wear on the resilient roll 16 necessitates frequent repair or replacement.

After passing through the embossing rolls 14,16, feed rolls 17,19 feed the web 11 to downstream processing stations, which typically include a device which perforates the web across its width, with the web then rolled on a mandrel and cut into individual roll-sized units. The perforations aid in removing a desired quantity of the paper product from a roll, and also aid in attaching two or more plies together where the fibrous web comprises multiple plies.

Figure 3:
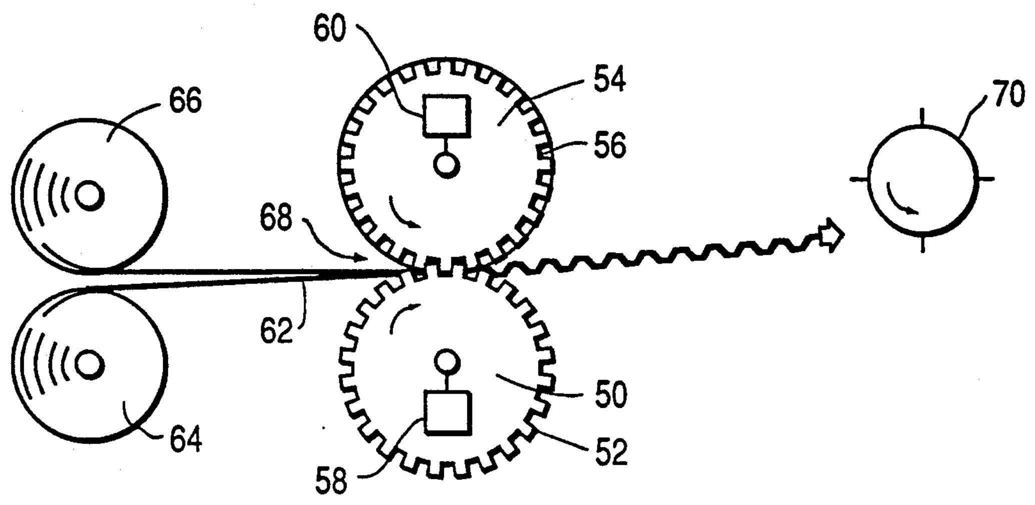
FIG. 3 is a side view of a rubber to steel embossing arrangement in accordance with the present invention.

In accordance with the present invention, the inventor has recognized that laser technology can be utilized for forming recessed portions or indentations in the surface of the resilient roll to provide an improved rubber to steel embossing method and apparatus. In particular, a laser can be utilized for burning away selected portions of the resilient roll, to form female portions corresponding to the male protuberances of the steel roll. As shown in FIG. 3, in accordance with the present invention, a first roll 50 is provided having a substantially rigid outer surface, preferably formed of steel. The outer surface includes a plurality of protuberances 52 corresponding to a desired embossed pattern. The protuberances 52 are shown representatively, and may take any desired form, shape or number in accordance with the present invention. A second roll 54 is provided having a resilient outer surface with female portions or recesses 56 provided corresponding to the embossed pattern of the protuberances 52, such that as the rolls 50,54 are in rolling engagement, the protuberances 52 of the rigid roll enter the recesses 56 of the resilient roll. The rigid and resilient rolls thus cooperate to form the embossed pattern on the web.

The recessed areas 56 are preferably formed of substantially the same size or even slightly smaller than the protuberances 52, however, the clearance associated with steel to steel mated embossing is not necessary, since the surface of the roll 54 can deform about the protuberances. Thus, the advantage of conventional rubber to steel embossing is realized in utilizing a resilient roll which can flow about the protuberances on the rigid roll to work the fibrous web and thereby soften the web while producing a highly defined pattern without perforating or penetrating the web. However, since the resilient roll includes the recesses, the extremely high pressures associated with prior art rubber to steel embossing is not necessary for causing the resilient rolls to flow or mold about the male protuberances. As a result, the heat generated as a result of the rolling contact and the repeated deformation of the rubber is significantly reduced.

Of at least equal significance is the fact that the problem of deflection is reduced, as the protuberances are received by the recesses and the application of extremely large forces at the ends of the roll shafts is not necessary. With the deflection problem reduced or eliminated, the rolls 50,54 may be formed much smaller than those typical in the prior art. In fact, rolls for use in the present invention may be made even smaller than 12 inches diameter, and even as small as six to eight inches in diameter.

An hydraulic system may be provided as shown schematically by cylinders 58,60, to allow for separation of the rolls, for example, to allow initial feeding and registration of the web between the rolls, and to urge the rolls together for the embossing operation. However, the force required for sufficiently urging the rolls together is much lower. Since the required force pressure between the rolls is less and since the mass of the rolls can be much less, a much less expensive hydraulic system and mounting arrangement can be utilized.

In addition, with the smaller rolls providing a more consistent gripping along the length of the rolls (across the width of the web 62), the rolls may be mounted and utilized as feed rolls. Thus, in contrast with conventional embossing arrangements, separate feed rolls and a separate embossing station are not necessary, and the mated rubber to steel embossing rolls may draw the web directly from unwinding rolls or supply rolls 64,66. While a pair of supply rolls is shown, to form a two-ply web 62, it is to be understood that multiple supply rolls may be provided for any desired number of plies or a single roll may be utilized to provide a single ply web or a multi-ply web in which the plies have been previously joined.

In accordance with the present invention, significant capital cost reductions may be realized by utilizing smaller rolls and eliminating entirely the need for a separate large embossing station. Conventional rubber to steel embossing stations can cost as much as $200–250 thousand dollars or more. A single steel embossed roll approximately $30,000, while the resilient emboss roll may be somewhat less. Utilizing smaller rolls which do not require a tremendous amount of pressure at the nip, the capital costs are much lower. In addition, since the heat generation and associated wear are reduced in the present invention as compared to the prior art, the life of the resilient roller is prolonged and maintenance thereto is reduced. Moreover, the dangerous conditions associated with the wear and deterioration of conventional resilient rolls are virtually eliminated. Thus, in accordance with the present invention, the rolls 50,54 may be utilized as embossing and feeding rolls, drawing the web or webs from a supply, embossing the web as it passes through the nip (68) and feeding the web toward downstream processing stations, for example a perforating station represented by perforating roll 70 shown in FIG. 3. As a result, the advantages of rubber to steel embossing are realized in providing a resilient roll which can work the paper as it is deformably engaged with the steel roll, while the high cost, rapid wear, extreme pressures and unsafe conditions associated with conventional rubber to steel embossing are avoided.

Figure 4:
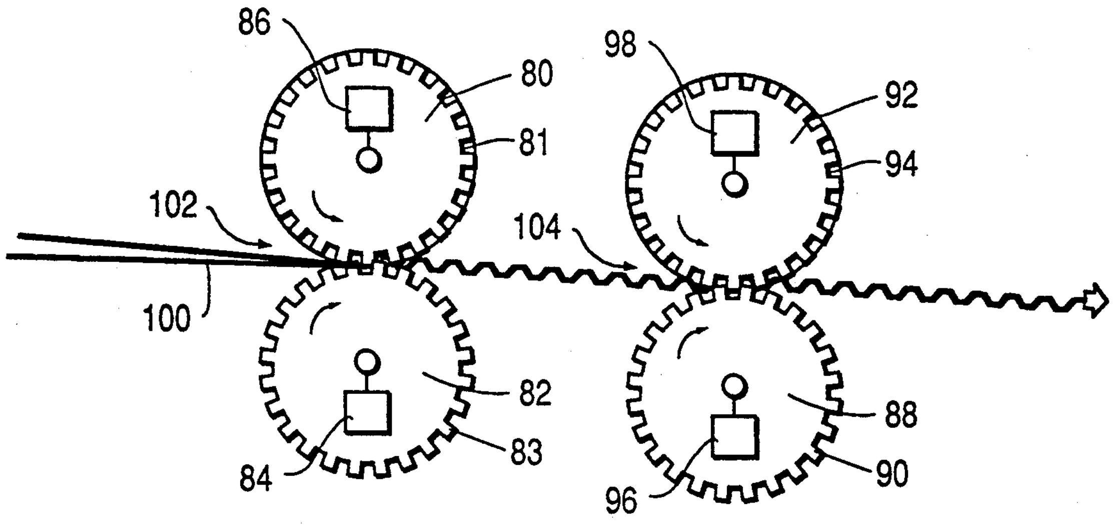
FIG. 4 illustrates a rubber to steel mated embossing arrangement in which two pairs of embossing rolls are provided.

Since the rolls may be formed much smaller and require much less capital, the present invention allows for the use of multiple embossing rolls or multiple pairs of embossing rolls, at a cost which is still less than that associated with a conventional rubber to steel embossing station having a single steel and single rubber roll. As shown in FIG. 4, a first pair of rolls 80,82 may be provided with protuberances 83 on the rigid or steel roll, and corresponding recesses 81 on the resilient roll cooperating as the rolls are in rolling contact or engagement. The hydraulic system may also be provided for retracting rolls, and for urging the rolls together, as represented by cylinders 84,86. Downstream from the first pair of rolls, an additional pair of embossing rolls may be provided, with a roll 88 having a rigid outer surface, such as steel, with a plurality of protuberances 90 thereon. The roll 88 will be placed in rolling contact with a roll 92 having a resilient outer surface, with recesses provided for receiving the protuberances 90. Hydraulic means 96,98 may also be provided.

The embossed pattern defined by the protuberances 90 may be the same or different from that of the protuberances 83. Where the embossed pattern is the same, the repeated embossing operation of the second pair of rolls improves the definition of the embossed pattern, as well as improving the softening by virtue of additional working of the fibrous web. Where the pattern is different, additional or more intricate patterns may be formed to supplement the embossed patterns formed by the first pair of rolls (80,82), with softening enhanced by virtue of the additional working of the fibrous web by passing the web through a pair of rubber to steel embossing nips.

In operation, the web 100 will pass through the first nip formed by the first pair of rubber to steel mated rolls 80,82, and then to the second nip 104 formed by the second pair of rubber to steel mated embossing rolls, 88,92. The web will then be fed to downstream processing stations. As with the FIG. 3 embodiment, the rolls can be utilized as feed rolls to draw the web directly from a supply, and the need for a large separate embossing station having huge rolls and heavy duty frames and hydraulic systems is eliminated. It is to be understood however that, if desired, feed rolls may be utilized between the supply rolls and the embossing rolls in accordance with the present invention.

Figure 5:
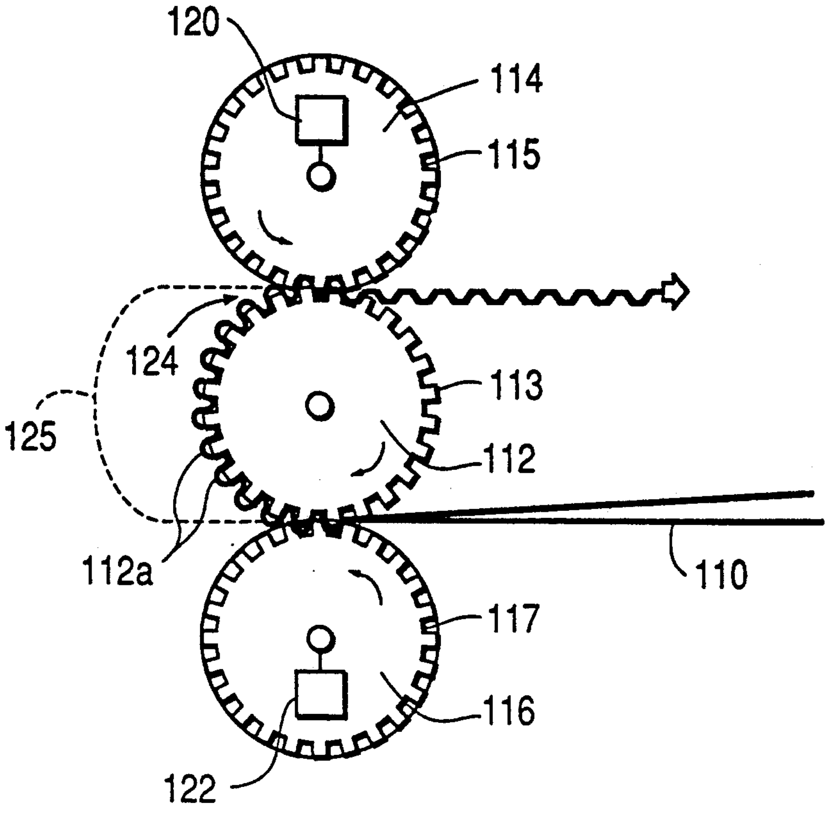
FIG. 5 illustrates a three roll arrangement in which two embossing operations are performed.

Another rubber to steel embossing arrangement, as shown in FIG. 5, provides a pair of nips for two embossing operations to be performed on a web 110, while only a single rigid roll 112 is utilized. In particular, a pair of rolls 114,116 is provided having resilient outer surfaces, with recessed portions 115,117 provided corresponding to the embossed pattern to receive protuberances 113 of the rigid roll. Preferably, the resilient rolls will be urged toward the rigid roll by suitable hydraulic means 120,122, with the resilient rolls forming nips with the rigid roll at substantially diametrically opposite locations on the rigid roll 112. The web 110 will thus be provided with a highly defined embossed pattern as a result of passing through a first nip 123 formed between the rigid roll 112 and resilient roll 116, and passing through a second nip 124 formed between the rigid roll 112 and the resilient roll 114. Thus, the repeated embossing improves the definition of the pattern and also improves the softness of the web.

The arrangement of FIG. 5 is particularly advantageous since the two step embossing is provided, while less rolls and less hydraulic force applicators are required, for example as compared to the arrangement of FIG. 4. In addition, with the web maintained against the steel roll (as shown at 112*a*) as it passes from the first nip 123 to the second nip 124, as shown at 112*a*, the registration of the embossed pattern provided at the first nip 123 is maintained as the web passes through the second nip 124. Note however, if desired, for example if it is noticed that the stress on the web becomes too great as it is passed about the roll 112, a small amount of slack may be provided as represented by the broken line shown at 125, such that the web is not in engagement with the roll 112 as it passes from the first nip 123 to the second nip 124. The diametrically opposed relationship of the resilient rolls on the rigid roll can further be advantageous, since the forces of the hydraulic systems are directed in opposite directions, and the deflection at each of the nips will be reduced or counteracted.

Figure 6:
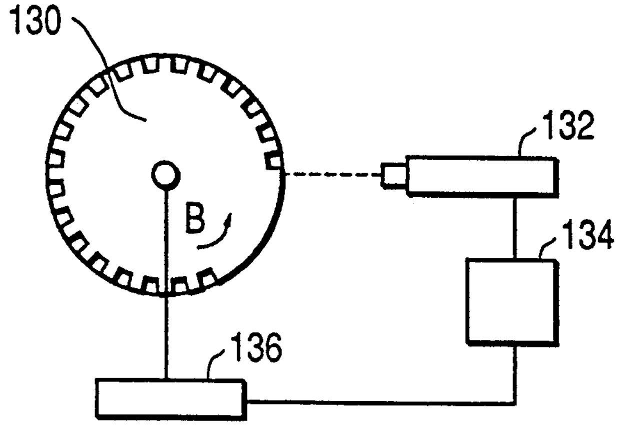
FIG. 6 illustrates the formation of a mated rubber roll for use in mated rubber to steel embossing in accordance with the present invention.

FIG. 6 representatively shows forming a female resilient roll utilizing a laser. A roll 130 is provided having a resilient outer surface upon which the female recesses are to be formed. A laser 132 is provided having an appropriate control system 134 for forming the embossed pattern along the length and about the periphery of the roll. The laser directs energy in the form of an intense light beam which burns away selected portions of the resilient roll 130 to form the recesses for receiving protuberances of a rigid male embossing roll for forming the embossed pattern. The laser system can be similar to that utilized in forming patterns in press plates for printing operations. The laser will burn away portions of the rubber at predetermined areas along the length of the roll, with the roll periodically rotated (arrow B) to form the recessed portions about the periphery of the roll. A motor 136 is provided for periodically rotating the roll, with the motor connected to the control 134, such that the roll positioning and recess forming by the laser are coordinated. The control 134 will selectively actuate the roll drive, or at least will receive a signal from the roll drive to indicate positioning of the roll such that the desired recess pattern can be formed about the roll periphery.

INDUSTRIAL APPLICABILITY

In accordance with the present invention, a laser can be utilized for forming recesses in a resilient embossing roll, for example, a roll having an outer rubber surface. The resilient roll can then be placed in contact with a rigid embossing roll having a plurality of protuberances which are received by the recessed portions of the resilient roll. By embossing utilizing a male rigid roll and female resilient roll, the advantages associated with rubber to steel embossing are realized, while the disadvantages associated with conventional rubber to steel embossing are avoided. In particular, the tremendous pressures, and the associated maintenance and replacement costs of conventional rubber to steel embossing are reduced. In addition, since tremendous pressures are not required for causing the rubber to flow about the male protuberances, and deflection of the rolls is not a problem, the rolls may be formed of a much smaller diameter, thereby tremendously decreasing the capital costs associated with the embossing equipment. Moreover, since deflection is not a problem, the more consistent highly defined pattern may be provided across the width of the fibrous web being embossed. Utilizing mated rubber to steel embossing, separate feeding rolls and a large embossing station are not necessary since the rolls may be utilized as feeding and embossing rolls, with the mated rubber to steel rolls drawing the web from supply rolls, and feeding the web to downstream processing stations.

What is claimed:

1. A method for embossing a fibrous web to improve the bulk and softness of the web by passing the web through a nip formed by a pair of rotating rollers, wherein a consistent high degree of definition is provided across the width of the fibrous web and a large amount of force or pressure between the rolls is not required for forming the embossed pattern, the method comprising:
   - providing a first roll having a substantially rigid outer surface, said outer surface having a plurality of protuberances thereon corresponding to a desired embossed pattern; and
   - providing a second roll having an outer surface formed of a resilient material, and removing selected portions of the resilient material from the outer surface of the second roll to form recessed portions for receiving the protuberances of the first roll;
   - placing the rolls in contact to form a nip between the rolls, with the protuberances of the first roll entering the recesses of the second roll as the rolls rotate together; and
   - passing a fibrous web through the nip formed by the rolls to emboss without perforating the fibrous web.

2. The method of claim 1, wherein the step of providing a second roll includes utilizing a laser to form the recesses in the second roll, by burning portions of the resilient material from the outer surface.

3. The method of claim 1, further including:
   - providing a third roll having a resilient outer surface, and recessed portions for receiving the protuberances of the first' roll;
   - placing the third roll in contact with the first roll to form a second nip, with the protuberances of the first roll entering the recesses of the third roll;
   - wherein the fibrous web is fed through nip formed by the first and second rolls, and then through the nip formed by the first and third rolls.

4. The method of claim 3, wherein the steps of placing the second and third rolls in contact with the first roll including placing the second and third rolls in contact with the first roll at substantially diametrically opposed positions on the first roll.

5. The method of claim 1, including utilizing said first and second rolls as feeding rolls to draw the web from a supply.

6. A method for embossing a fibrous web to improve the bulk and softness of the web by passing the web through a nip formed by a pair of rotating rollers, wherein a consistent high degree of definition is provided across the width of the fibrous web and a large amount of force or pressure between the rolls is not required for forming the embossed pattern, the method comprising:
   - providing a first roll having a substantially rigid outer surface, said outer surface having a plurality of protuberances thereon corresponding to a desired embossed pattern;
   - providing a second roll having an outer surface formed of a resilient material;
   - utilizing a laser to burn portions of the resilient material from the outer surface of the second roll, thereby forming recessed portions corresponding to the plurality of protuberances upon the first roll, such that when the rolls mesh together a web passing therebetween will be embossed without being perforated or cut by the first and second rolls;
   - placing the rolls in contact to form a nip between the rolls, with the protuberances of the first roll entering the recesses of the second roll as the roll rotate together; and
   - passing a fibrous web through the nip formed by the rolls to emboss the fibrous web without perforating the web as it passes through the nip.

7. The method of claim 6, wherein the step of providing a second roll includes providing a roll having a length of at least 80 inches and a diameter not greater than 12 inches.

* * * * *